Figure 1:
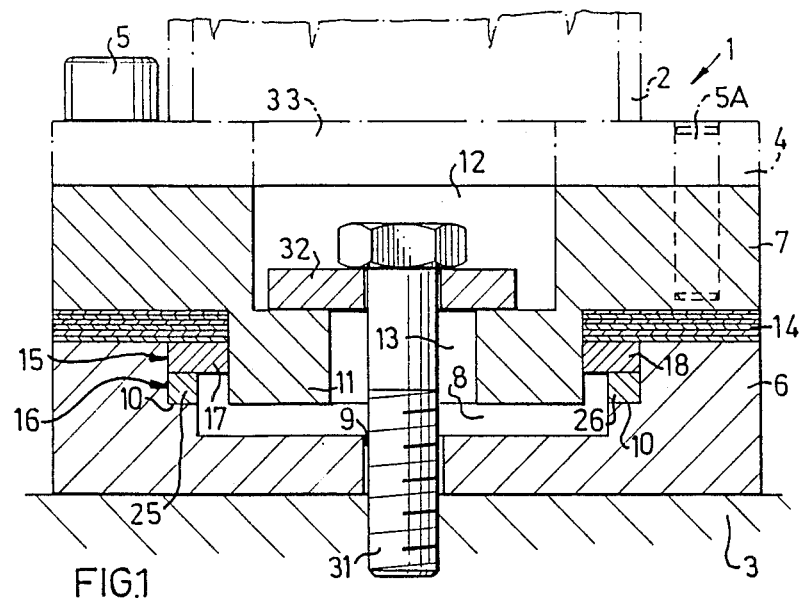

United States Patent [19]

Bildtsén

[11] Patent Number: 4,830,529
[45] Date of Patent: May 16, 1989

[54] DEVICE FOR FIXING AN OBJECT AGAINST A SUPPORTING SURFACE

[75] Inventor: Sven Bildtsén, Bromölla, Sweden

[73] Assignee: AB Volvo, Gothenburg, Sweden

[21] Appl. No.: 141,968

[22] Filed: Jan. 7, 1988

[30] Foreign Application Priority Data

Jan. 22, 1987 [SE] Sweden ............................ 8700249

[51] Int. Cl.[4] ............................................. F16D 1/00
[52] U.S. Cl. ..................................... 403/4; 403/408.1
[58] Field of Search ........................... 403/3, 4, 408.1

[56] References Cited

U.S. PATENT DOCUMENTS

| | | | |
|---|---|---|---|
| 2,177,148 | 10/1939 | Newhall | 403/4 |
| 2,917,139 | 12/1959 | Stough | 403/3 |
| 3,006,443 | 10/1961 | Siler | 403/408.1 |
| 3,305,995 | 2/1967 | Armstrong et al. | 403/408.1 XR |
| 3,428,113 | 2/1969 | Kluth | 403/3 XR |

Primary Examiner—Andrew V. Kundrat
Attorney, Agent, or Firm—Young & Thompson

[57] ABSTRACT

A device for fixing an object on a supporting surface and having structure for adjusting the position of the object comprises a lower part for fixing against the support surface, an upper part for mounting on the lower part, and locating structure between the two parts for determining the relative position therebetween in two mutually perpendicular directions in the dividing plane between the parts. The locating structure consists of parallel locating strips placed on either side of a rectangular cavity in the lower part. The position of the upper part relative to the lower part in each direction is adjusted by replacing the two locating strips with two other ones of the same total width but with individual widths differing from those of the strips they replace. The upper part is also fixed by a fastener to the lower part and the supporting surface and has structure for fixing the object. Spacers between the lower and the upper parts permit adjustment in a direction perpendicular to the dividing plane between the two parts.

6 Claims, 1 Drawing Sheet

U.S. Patent May 16, 1989 4,830,529

DEVICE FOR FIXING AN OBJECT AGAINST A SUPPORTING SURFACE

The invention relates to a device for fixing an object against a supporting surface, said device comprising means for making it possible to adjust the position of the object in relation to the supporting surface.

In various contexts it can be of interest to fix an object in a predetermined position relative to a plane of reference, and it is thereby desirable to also be able to make minor adjustments of the position of the object. One example of this is in various types of assembly and jointing means, for example when welding together sheet metal parts. The objects to be placed in predetermined positions can be guide heels, guide pins or the like to make it possible for correct placement of the parts to be assembled or welded together.

It is previously known to construct special fixing devices for guide pins, guide heels and the like, where a particular device is constructed for each particular case. A number of interconnected angle brackets can be used for example. Adjustability is made possible with the aid of spacer washers in the fasteners between the individual angle brackets. This means that in order to adjust the position of a guide heel, a guide pin or the like, it may be necessary to disengage a number of fasteners between the various angle brackets in order to increase or reduce the number of spacer washers. This involves an appreciable amount of work and presents problems with accuracy of adjustment. Furthermore, these previously known devices are dedicated to a particular workpiece, which means that a change in the workpiece will make the entire device unusable so that it must be replaced by another device which is suited to the new workpiece.

The purpose of the present invention is to achieve a fixing device of the type described by way of introduction which is universally applicable, i.e. it can be re-used in various contexts and be adapted to various workpieces by replacing a minimum of parts.

Figure 2:
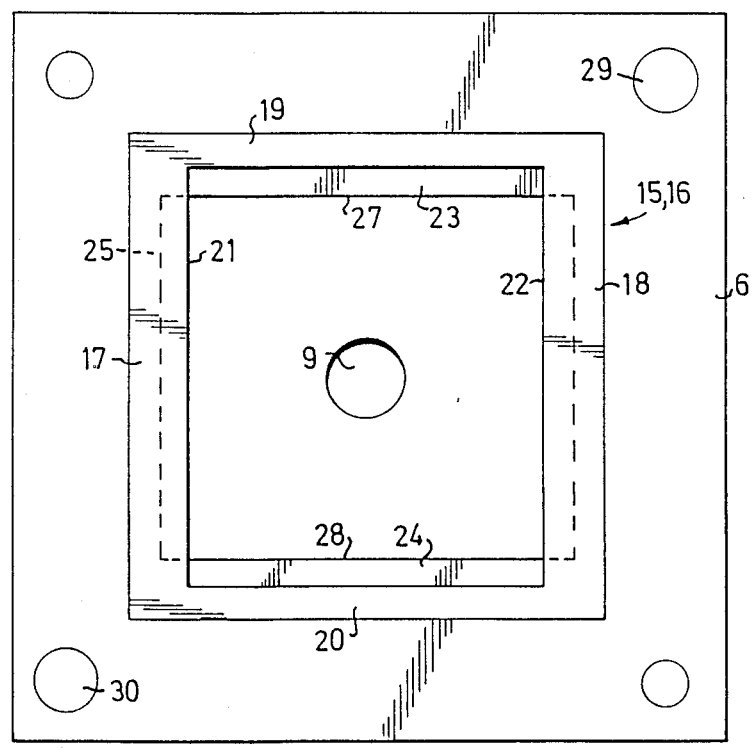

The invention will be described in more detail below with reference to the accompanying drawing, in which FIG. 1 shows a section through a fixing device according to one embodiment of the invention, and FIG. 2 shows a plan view from above of the fixing device shown in FIG. 1 with upper part and spacers removed.

The drawing shows a device 1 according to the invention for fixing an object 2 against a supporting surface 3. Only a portion of the object 2 is shown, but the object can be for example a bracket or the like carrying on its free end (not shown) a guide pin, a support heel or the like. The object 2 also has at its end facing the fixing device 1 base plate 4 which is fixed to the fixing device 1 by means of bolts 5, of which only one is shown in the drawing, as well as guide pins 5A. The supporting surface 3 is in this case a coordinate table or the like, the surface of which is carefully placed and in which the mounting holes for the fixing device 1 can be arranged in accurately determined positions.

The fixing device 1 comprises a lower part 6, which is intended to lie on the supporting surface 3, and an upper part 7, which is placed on the lower part 6 and to which the object 2 is fixed. The two parts 6 and 7 are essentially made as square plates and they have the same external dimensions, which means that when the upper part 7 is placed on the lower part, their outer contours will coincide. In this connection it should be pointed out that the terms "lower part" and "upper part" are only used to provide simple names for the respective parts and it should be obvious that the fixing device 1 can also be used on surfaces 3 which are not horizontal.

The lower part 6 is made with a centrally placed, square cavity 8, the bottom of which is provided with firstly a centrally placed thru-hole 9 and secondly a narrow ledge 10 along all four sides. The upper part 7, as evident from FIG. 1, is made with a projection 11 on its bottom, and the projection 11 extends into the cavity 8 in the lower part 6. The projection 11 is square as is the cavity 8, but is of smaller dimensions than the cavity 8, as is evident from FIG. 1. The upper part 7 also has an upwardly directed depression 12, the bottom of which has a relatively large, centrally placed thru-hole 13, the function of which will be described in more detail below.

Between the lower part 6 and the upper part 7 there are a number of spacers 14, six in number in the example shown. The purpose of the spacers 14 is to make it possible to adjust the position of the object 2 vertically relative to the supporting surface 3. This can be done by increasing or reducing the number of spacers 14 or by replacing the spacers with spacers of another thickness or by a combination of these steps.

On the ledge 10 in the cavity 8 of the lower part 6, there are two frames 15,16, the purpose of which is to localize the projection 11 on the upper part 7 in relation to the cavity 8 in the lower part 6. As best can be seen in FIG. 2, the frame 15 consists of two locating strips 17,18, parallel to each other and joined at their ends by means of two connecting strips 19,20. The distance between the facing edges 21,22 on the locating strips 17,18 corresponds to the width of the projection 11 of the upper part 7, and the frame 15 fits quite precisely into the cavity 8 above the ledge 10 in the lower part 6. The distance between the connecting strips 19,20 is, however, greater than the distance between the locating strips 17,18, which means that the frame 15 will provide precise location of the upper part 7 in relation to the lower part 6 in one direction but will permit movement of the upper part 7 in a direction perpendicular thereto.

The frame 16 is made in the same manner as the frame 15 and consists of two locating strips 23,24, which are connected at their ends by connecting strips 25,26. In the same manner as the frame 15, the distance between the facing edges 27,28 of the locating strips 23,24 corresponds to the dimension of the projection 11 of the upper part 7. This means that the upper part 7 is located by means of the projection 11 precisely between the edges 27 and 28. Since these edges are perpendicular to the edges 21,22 on the locating strips 17,18 of the frame 15, the projection 11 and thus the entire upper part 7 will be precisely located in two mutually perpendicular directions in the dividing plane between the lower part 6 and the upper part 7.

The lower part 6 is located in relation to the supporting surface 3 by means of guide pins 29 and 30, which extend through holes in the lower part 6 down to corresponding holes in the supporting surface 3. In order to fix the upper part 7 against the lower part 6 and to fix the entire fixing device 1 against the supporting surface 3, a bolt 31 is used, which extends through the hole 13 in the upper part 7 and through the hole 9 in the lower part 6 and is screwed into a threaded hole in the supporting surface 3. Between the head of the bolt 31 and the bottom of the depression 12 in the upper part 7 there is a washer 32 for transmitting the compressive force from the bolt 31 to the upper part 7. The hole in the washer 32 is excentrically placed, as can be seen in FIG. 1. The reason for this will be described in more detail below. With the aid of the bolt 31, the entire fixing device 1 is pressed against the supporting surface 3, and after mounting of the object 2 and its base plate 4 on the upper part 7 with the aid of the bolts 5, the object 2 is precisely located in relation to the supporting surface 3. In order to facilitate assembly and disassembly of the fixing device 1, the base plate 4 of the object 2 can also be made with a thru-hole, through which it is possible to insert a tool for screwing and unscrewing the bolt 31.

As discussed above, the spacers 14 provide for adjustment of the vertical position of the object 2 relative to the supporting surface 3, i.e. perpendicular to the dividing plane between the lower part 6 and the upper part 7. According to the invention, it is also possible to make adjustments in two mutually perpendicular directions in the dividing plane between the lower part 6 and the upper part 7. This is done by replacing the frames 15 and 16 with other frames of the same outer dimensions and with the same distance between the edges 21,22 and 27,28 but with locating strips 17,18 and 23,24 having different relative width. This means that for each of the frames, one locating strip is narrower while the other locating strip is broader. Expressed differently, this means that the opening in each frame 15,16 has the same width, i.e. the same distance between the edges 21,22 or 27,28, but that the opening will be more or less displaced to one side of the frame. This means that it is possible with a relatively small number of frames to adjust the upper part 7 relative to the lower part 6 in a large number of different positions. The upper part 7 can be adjusted in opposite directions with the aid of the same frames by turning the frames 180°.

As evident from the above, the fixing device according to the invention is of simple construction but makes is possible to make adjustments in three orthogonal directions. Particularly if the base plate 4 of the object 2 is provided with a thru-hole 33 for a tool, the adjustment will be quite simple to carry out. All that is required is that the bolt 31 be unscrewed, whereafter the total thickness of the spacers 14 is changed to the desired value and/or one or both of the frames 15,16 is replaced by other frames with an opening which is displaced in the desired direction. The bolt 31 is then tightened again and the entire adjustment process is thus completed. Thereafter it is also possible to see in which direction the fixing device has been adjusted and it is also possible to determine how much of an adjustment movement has been made. This can be done by the upper part 7 after adjustment extending beyond the lower part 6 in some direction, and the size of this protruding portion can be determined. It is also possible to count the number of spacers 14 and thus determine to what extend vertical adjustment has been made. After displacement of the upper part 7 in relation to the lower part 6, the washer 32 is turned so that the excentrically placed hole in the washer will coincide with the hole 9 in the lower part 6 at the same time as the washer is in contact with the bottom of the depression 12 in the upper part 7.

The material of the various parts of the fixing device is preferably metal but other materials are also conceivable. If it is desired to have the object 2 electrically insulated from the support surface 3, the upper part 7 can for example be made of electrically insulated material or be provided with an electrically insulating coating.

The invention is of course not limited to the example described above. Rather, changes can be made within the scope of the following claims.

I claim:

1. Device for fixing an object on a supporting surface, said device comprising means for making it possible to adjust the position of the object in relation to the supporting surface, characterized by a first part for fixing against the supporting surface in a predetermined position relative thereto, a second part for mounting against the first part and locating means arranged between said parts for determining the relative position between said parts in two mutually perpendicular directions in the dividing plane between said parts, said locating means comprising for each direction two mutually parallel locating strips, which are placed against individual sides of a rectangular cavity in one of said parts and which together have a width such that a rectangular projection on the other of said parts fit with negligible play in between the facing edges of the locating strips, adjustment of the position of said parts relative to each other in each direction taking place by replacing the two locating strips with two other locating strips of the same total width but with individual widths differing from those of the strips they replace said parts being arranged to be fixed by means of fixing means to each other and the supporting surface and being provided with means for locating and fixing the object which is to be mounted on the supporting surface.

2. Device according to claim 1, characterized in that the two locating strips are joined at their ends by means of connecting strips in order to form together therewith an externally rectangular frame which fits into said rectangular cavity.

3. Device according to claim 2, characterized in that the frame is externally square and that each of the connecting strips is at most as wide as the narrowest locating strip.

4. Device according to claim 1, characterized in that spacers are arranged between said parts to make adjustment possible in a direction perpendicular to the dividing plane between said parts by changing the number and/or thickness of the spacers.

5. Device according to claim 1, characterized in that the fastening means of said second part consists of a single, centrally placed fastener which is accessible from one side of said second part and which extends through both said parts and is detachably fixed to the supporting surface.

6. Device according to claim 5, characterized in that the object has a base plate with a central opening for a tool interacting with the fastener for manoeuvering the fastener.

* * * * *